J. I. McCLINTIC.
Corn-Harvesters.

No. 153,777. Patented Aug. 4, 1874.

WITNESSES:
Chas. Nida.
Sedgwick

INVENTOR:
J. I. McClintic
BY
ATTORNEYS.

UNITED STATES PATENT OFFICE.

JOHN INSKEEP McCLINTIC, OF MONROE CITY, MISSOURI.

IMPROVEMENT IN CORN-HARVESTERS.

Specification forming part of Letters Patent No. 153,777, dated August 4, 1874; application filed April 25, 1874.

*To all whom it may concern:*

Figure 1:
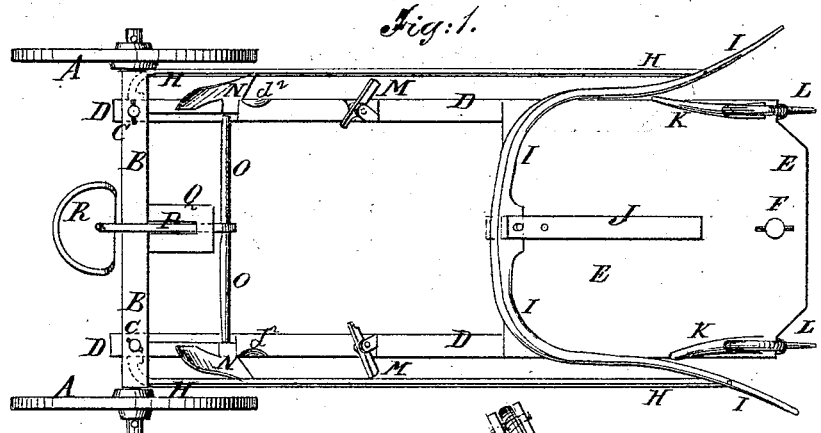
Figure 2:
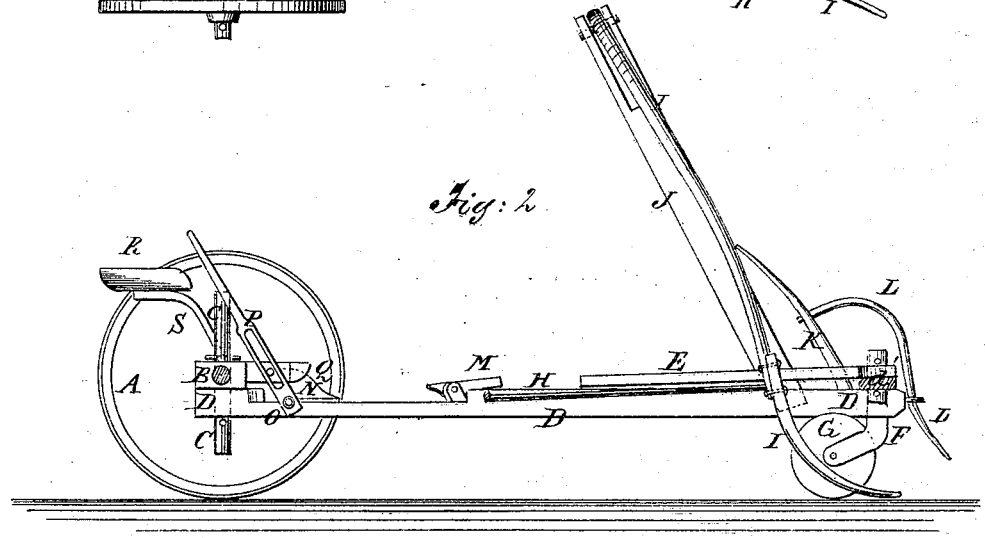
Figure 3:
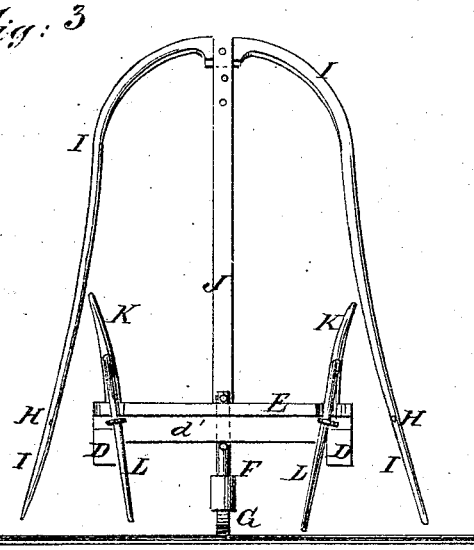

Be it known that I, JOHN I. MCCLINTIC, of Monroe City, in the county of Monroe and State of Missouri, have invented a new and useful Improvement in Corn-Harvester, of which the following is a specification:

Figure 1 is a top view of my improved corn-harvester; Fig. 2, a longitudinal section of the same. Fig. 3 is a front view of the same.

Similar letters of reference indicate corresponding parts.

The invention will first be fully described, and then pointed out in the claims.

A are the wheels, by which the rear part of the machine is supported, and which revolve upon the journals of the axle B. Through the axle B, at a little distance from the wheels A, are formed vertical holes, through which are passed upright bars C, which are supported by pins passed through them above the axle B, several holes being formed in the said bars to receive the said pins, so that the bars may be readily adjusted with their lower ends at any desired distance from the ground. The lower ends of the bars C pass through holes in the rear ends of the beams D, and have pins passed through them, upon which the said beams rest. The forward ends of the beams D are connected and held in their proper relative position by a cross-bar, $d'$, attached to their upper sides, and to which is secured the forward part of the platform E, the rear part of which is secured to the middle parts of the beams D. To the center of the cross-beam $d'$ is pivoted the standard F of the caster-wheel G, by which the forward end of the machine is supported. With the outer sides of the rear ends of the beams D are connected the rear ends of the bars H, which extend forward parallel, or nearly so, with the beams D, to form a passage-way for the corn-stalks as the machine is drawn forward. The forward ends of the guide-bars H are attached to the end parts of the bent or U-fender I. The ends of the arms of the fender I are bent forward to form fingers, or have bent fingers attached to them, to raise the corn-stalks that may have been bent down outward and raise them, the arms of the fender guiding them into such a position that when cut their top may fall upon the inclined platform E. The center of the bent fender I is inserted in a slot in the upper end of the standard J, where it is secured in place by a pin, several holes being formed in said standard to receive the said pin, so that the fender may be readily adjusted to bring its fingers closer to or further from the ground, as may be required. The standard J is secured to the forward part of the inclined platform E, with its upper end inclined to the rearward, as shown in Fig. 2. K are guards attached to the forward parts of the beams D, and which project upward into such a position as to prevent the forward ends of the cut stalks from falling against the fender into such a position as to interfere with the entrance of the standing stalks into the guide-passage. L are fingers, attached to the forward side of the ends of the cross-beam $d'$, and the lower ends of which project downward and curve forward, so as to raise the stalks that may be bent down inward and guide them into the passage between the beams D and bars H. The upper ends of the fingers L are curved to the rearward, and are attached to the guards K. M are gates hinged to the beams D, and extending outward to the bars H, which are raised by the standing stalks as they pass back through the guide-passage, and again drop into place to prevent the stalks when cut from falling in front of the knives, and thus obstructing the passage-way. N are the knives, which are attached in an inclined position to the beams D, a little in front of the axle B, and which are made with a broad back, inclined at an angle with the blade, to guide the butts of the stalks when cut off to the side of the beams D, where they rest upon the cross-bar O, the ends of which rest in rabbets in the upper side of the rear parts of the beams D. To the middle part of the cross-bar O is attached the lower end of the lever P, which passes up through a slot in an arm, Q, attached to the forward side of the axle B, where it is pivoted by a pin attached to said arm, and which passes through a slot formed longitudinally in the said lever, and serves as a fulcrum for said lever.

By this construction when a sufficient amount of the stalks for a bundle has been cut, and has fallen upon the machine, the cross-bar O is withdrawn from beneath their butts by means of the lever P, allowing the said butts to drop to the ground, where their weight keeps them in place, and draws their tops from the inclined platform E.

R is the driver's seat, the standard S of which is attached to the center of the axle B, in the beams D. Just in front of the knives N are formed notches $d^2$, which assist in holding the stalks against the action of the knives while being cut.

Having thus described my invention, I claim as new and desire to secure by Letters Patent—

1. The U-fender I, having curved fingers upon the ends of its arms, in combination with the standard J, the guide-bars H, the cross-beams D $d'$, and the platform E, substantially as herein shown and described.

2. The guards K, in combination with the cross-beams D $d'$, the platform E, and the fender I, substantially as herein shown and described.

JOHN INSKEEP McCLINTIC.

Witnesses:
   FREDK. B. SCHEETZ,
   BENJ. H. H. TUCKER.